(12) United States Patent
Radu, Jr.

(10) Patent No.: US 7,950,872 B2
(45) Date of Patent: May 31, 2011

(54) GALVANNEALED STEEL FORMS

(76) Inventor: John Radu, Jr., Warren, OH (US)

( * ) Notice: Subject to any disclaimer, the term of this patent is extended or adjusted under 35 U.S.C. 154(b) by 620 days.

(21) Appl. No.: 11/933,513

(22) Filed: Nov. 1, 2007

(65) Prior Publication Data
US 2009/0113828 A1 May 7, 2009

(51) Int. Cl.
*E01F 1/00* (2006.01)
*E01C 11/22* (2006.01)
*E04B 1/16* (2006.01)

(52) U.S. Cl. ........... 404/7; 404/8; 404/98; 249/2; 249/4; 249/6; 249/160; 249/168; 403/319

(58) Field of Classification Search ............... 249/160, 249/168, 211, 219.1, 2–6; 404/98, 7–8, 47, 404/68–69; 403/294, 373, 393, 231, 205, 403/402, 403; 52/319, 332, 719, 380–383, 52/330; 256/13.1
See application file for complete search history.

(56) References Cited

U.S. PATENT DOCUMENTS

| | | | | |
|---|---|---|---|---|
| 3,242,833 A | * | 3/1966 | Sondheim | 249/208 |
| 3,379,105 A | * | 4/1968 | Lynch | 404/8 |
| 3,497,172 A | * | 2/1970 | Welch | 249/3 |
| 4,202,145 A | * | 5/1980 | Coulter et al. | 52/169.1 |
| 4,901,497 A | * | 2/1990 | Lee | 52/578 |
| 5,468,095 A | * | 11/1995 | Dawson | 404/118 |
| 5,700,106 A | * | 12/1997 | Young et al. | 404/8 |
| 6,010,276 A | * | 1/2000 | Young et al. | 404/8 |
| 6,099,202 A | | 8/2000 | Walton et al. | |
| 6,375,384 B1 | * | 4/2002 | Walton et al. | 404/8 |
| 6,409,422 B1 | | 6/2002 | Mittermaier et al. | |
| 2007/0028552 A1 | * | 2/2007 | DeLoach, Sr. | 52/677 |

* cited by examiner

Primary Examiner — Jeanette E. Chapman
(74) Attorney, Agent, or Firm — Walker & Jocke

(57) ABSTRACT

A form for receiving a filler material to create an island is provided. The form is made essentially entirely out of galvannealed steel that is easily paintable. The form has a substantially continuous wall having an outer surface and an inner surface. The wall is made out of a plurality of galvannealed steel wall sections. The wall has a first side and a second side opposite the first side. The inner surface forms an enclosed chamber for receiving the filler material. A first support made out of galvannealed steel is attached to the inner surface of the first side of the wall and a second support made out of galvannealed steel is attached to the inner surface of the second side of the wall. A brace made out of galvannealed steel is disposed between the supports, wherein the brace removably engages the supports.

6 Claims, 10 Drawing Sheets

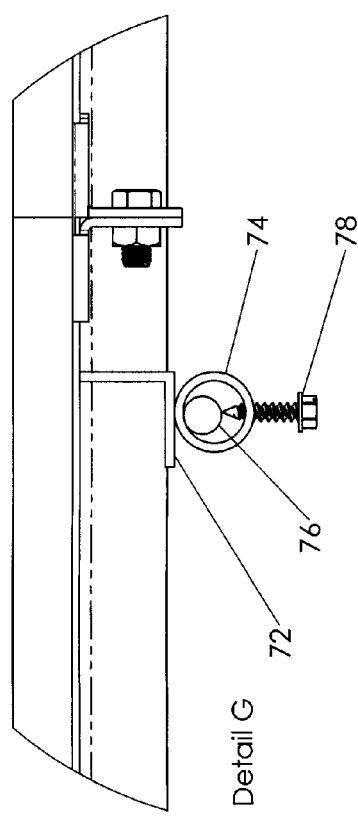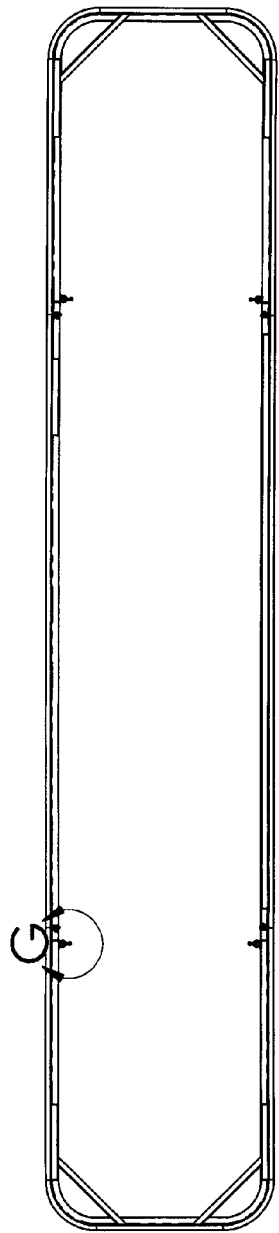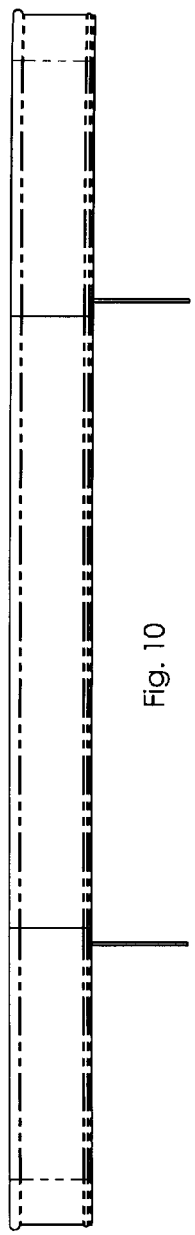

GALVANNEALED STEEL FORMS

TECHNICAL FIELD

This invention is related to forms to receive and retain liquid filling material used in construction projects. Specifically this invention relates to a form for pouring concrete for islands that are readily paintable, corrosion resistant, and that can be easily assembled and leveled at the job site and be used to support fuel dispensers, ATM machines, pole bases, walkways, handicap ramps, building and kiosk forms, among others.

BACKGROUND ART

Currently, a form for pouring a concrete structure such as an island for fuel dispensing is constructed by aligning a plurality of sheet metal members in an arrangement to define an enclosure. These members then become a permanent part of the concrete structure they retain. The sheet metal commonly used is a 12 Ga. carbon steel that is fabricated then prime painted by the manufacturer. A finish coat of paint is applied to the primed metal form after construction is complete and the fuel dispensers are set. This finish coat adds extra protection to the carbon steel and the color is selected to integrate with the owner's corporate image. One long-standing objection to the use of this material is its inherent susceptibility to corrosion and rusting over a relatively short period.

In an effort to extend the life of concrete forms and reduce the costly maintenance associated with carbon steel, many manufacturers have begun to offer hot dipped galvanized and stainless steel forms. Stainless steel retains its integrity and appearance over an extended period of time, but typically costs 4 to 5 times as much as comparable carbon steel forms. Hot dipped galvanized forms can have double the life of a painted carbon steel form, but there are manufacturing and finishing issues that add extra costs to this process. The added manufacturing costs arise from the additional handling required to have the forms hot dipped after fabrication. Typically, these costs are double the cost of the form itself. Additionally, hot dipped components need to have their holes and connection parts custom manufactured larger so that when the galvanized coating is applied the parts will be the correct size and align properly. The added finishing costs arise out of the fact that a hot dipped surface is not easily painted. The purpose of the galvanizing zinc coating is to provide excellent protection against corrosion of the base steel, but the coating is not intended to withstand outdoor exposure without chemical treatment or painting. Painting galvanized steel requires careful preparation and a good understanding of both painting and galvanizing. These additional costs result in a final installed price that is very close to that of stainless steel. Furthermore, hot dipped forms produce a final form that has an uneven surface and appearance. That is because the hot dipped process galvanizing material the steel sections are dipped into does not evenly coat each section. As the molten zinc cools below its melting point, it does not uniformly drip from the steel surface it is cooling on. Edges where the hot dipped material dripped from have an uneven surface where some material cools to a thicker and uneven layer which form globules of hardened zinc where it dries just before it was able to drip from the material it dries to.

Additionally, forms for pouring a concrete structure are often constructed by aligning a plurality of metal members in an arrangement to define an enclosure. The adjacent sheet metal members are then connected and secured together by means of nuts and bolts at the site. The alignment process during the assembly of such a concrete form can be labor intensive and therefore costly because the labor to align the nuts and bolts and associated brackets during the assembly process can often at times exceed the cost of the material to construct the form.

What is needed is an invention that solves these and other problems.

DISCLOSURE THE INVENTION

Accordingly, it is an object of an example embodiment to provide a pouring form to receive filler material.

It is another object of an example embodiment to provide a pouring form to receive poured concrete.

It is a further object of an example embodiment to provide island forms which are easier and less costly to assemble.

It is a further object of an example embodiment to provide a pouring form that is more resistive to corrosive elements than galvanized hot dipped steel.

It is still yet another object of an example embodiment to provide a pouring form that readily accepts paint.

It is still another objects of an example embodiment to provide pouring forms which have simplified wall member joints.

It is yet still another object of an example embodiment to provide pouring forms which have simplified wall member joints that prevent liquid concrete from leaking.

The foregoing objects are accomplished in an example embodiment by creating a form, in an example embodiment which comprises a substantially continuous wall having an outer surface and an inner surface. The wall has a first side and a second side opposite the first side. The inner surface forms an enclosed chamber for receiving the filler material. A first support is removably attached to the inner surface of the side of one of a plurality of wall members and a second support is removably attached to the inner surface of the side of an adjacent wall member. A cross member is disposed between the supports, wherein the cross member removably engages the supports.

In an example embodiment, the wall further comprises a plurality of wall members. Each adjacent wall member is removably secured to the corresponding adjacent wall member with a connection device. A first flat tab and a first curved tab extend from a wall member connection device. The first flat tab member and first curved tab member extend into the second half of a connection device of an adjacent wall member that has a straight slot and a tab over a curved wall member slot for interconnecting the adjacent wall members. A plurality of support bars can be attached to the inner surface of the wall members, and a plurality of cross members can be connected between opposed support bars to add strength and rigidity to the pouring form.

Another example embodiment includes interlocking elements incorporated into multi-paneled forms so that a minimum number of parts are necessary for the construction of the pouring form. In some embodiments a connecting device is provided so that the island form can be easily assembled at the site requiring a minimum amount of time. In some embodiments a reinforcing device may be connected to the internal walls of the pouring form. In an example embodiment the multi-paneled forms may be manufactured out of galvannealed steel by a process that ensures uniformity of parts so that nuts and bolts are minimally used for assembling the pouring form. Example embodiments may include a multi-paneled form for molding concrete that is lightweight and easily transportable. A further example embodiment provides leveling devices attached to the pouring form to allow rapid leveling of the pouring form at the job site where the forms will be installed.

Corner brace members provide further rigidity for the concrete form mold prior to pouring of the fluid concrete therein.

The aforementioned parts for the island form may be manufactured by a roll forming process. The roll forming process may be a process including eight roll forming stations. In some embodiments each station may use a different set of rolls. As a section of steel passes through a station, the rollers in the station are capable of bending the steel a little more than the prior station. In some embodiments the same roll forming machine can be set up to produce galvannealed steel wall members and can also be set up to produce galvanized steel members that will later be hot dipped. In some embodiments software running in a computer may be programmed to allow a computer to set up the roll stations for galvannealed or hot dipped steel fabrication.

An example embodiment may include a method of manufacturing pouring forms that provides for the steps of: (a) setting up a machine to produce galvannealed steel forms or forms made out of another steel material such as one that might be later hot dipped; (b) manufacturing the pouring form wall members; (c) washing the pouring form components in a first wash stage; (d) washing the pouring form components in a second stage; (e) painting the pouring form components by completely dipping the components in a paint tank; (f) drying the paint on the pouring form components by heating; (g) transporting the pouring forms to the job site; (h) assembling the pouring forms at the job site; and (i) leveling the pouring forms.

Other objects, advantages and applications of the example embodiments will become apparent to those skilled in the art when the following description of the best modes contemplated for practicing some embodiments is read in conjunction with the accompanying drawings.

BRIEF DESCRIPTION OF DRAWINGS

FIG. 8 is an example top view of a leveling device for the pouring form.

FIG. 9 is an example top view showing the positioning of four leveling devices within a pouring form.

FIG. 10 is an example side view of a pouring form with leveling devices.

BEST MODES FOR CARRYING OUT INVENTION

Figure 1:
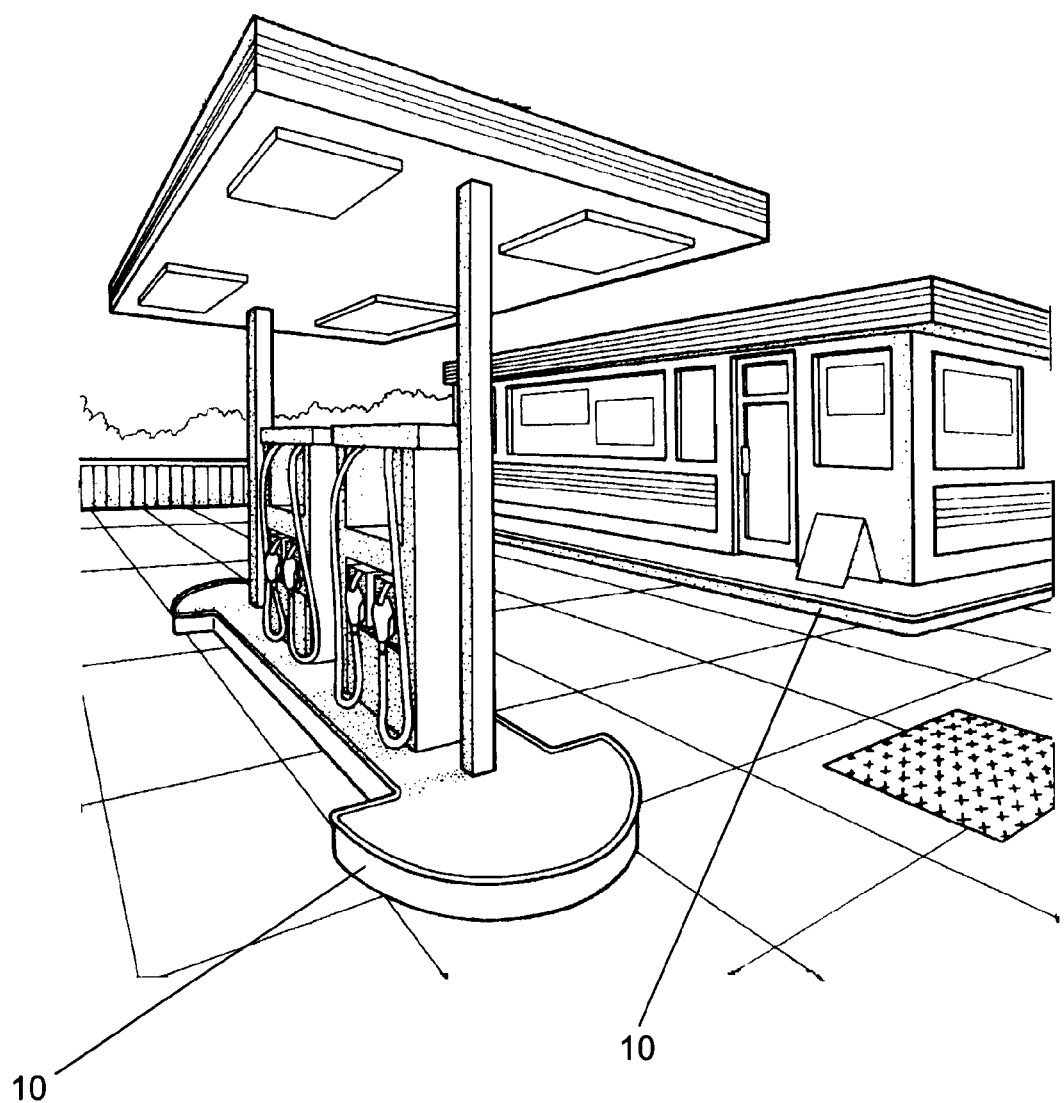
FIG. 1 is an example showing the pouring form in use at a gas station.

Referring now to FIG. 1, an example embodiment of a liquid pouring form 10 is shown in use as a pump island form for a gas station. Also shown in FIG. 1 the liquid pouring form 10 is may be used to form a curb or sidewalk around the gas station attendant structure. While the use of the pouring form 10 has been shown as a pump island and a curb, these are example embodiments only. The pouring form can be used anywhere liquids or fill materials such as concrete are used, for example, driveway forms, deck forms, road curb forms, other island structures for ATMs at banks, light pole islands, drive-in restaurant forms and islands, parking garage forms and islands, and the like. The filler material in the island or behind the forms could be any liquid such as liquid concrete, plastics, gels, slurry, building materials, epoxies and any other suitable filler material.

Figure 2:
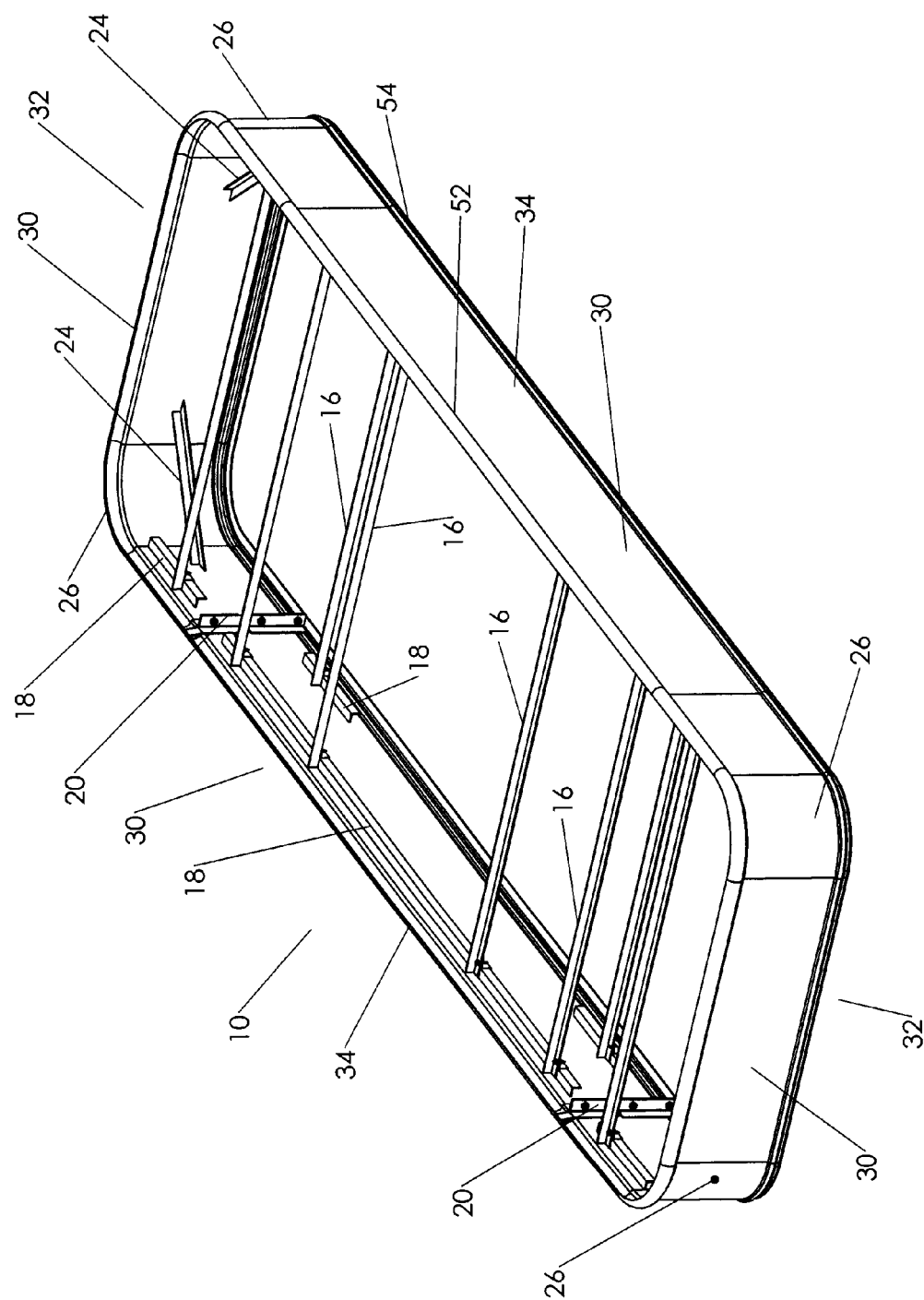
FIG. 2 is an example isometric view of a pouring form showing internal details.
Figure 3:
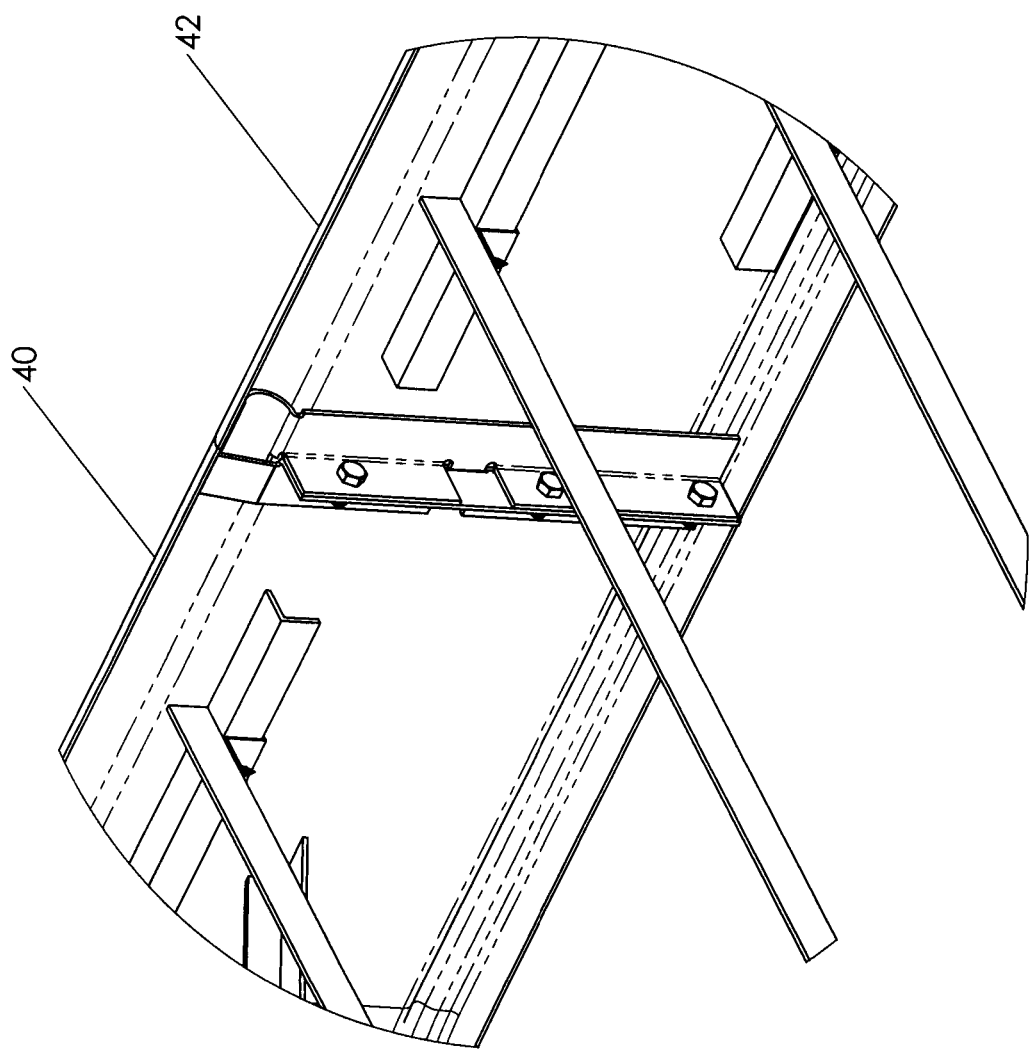
FIG. 3 is an example view of a connecting device connecting two wall members in a closed position.
Figure 4:
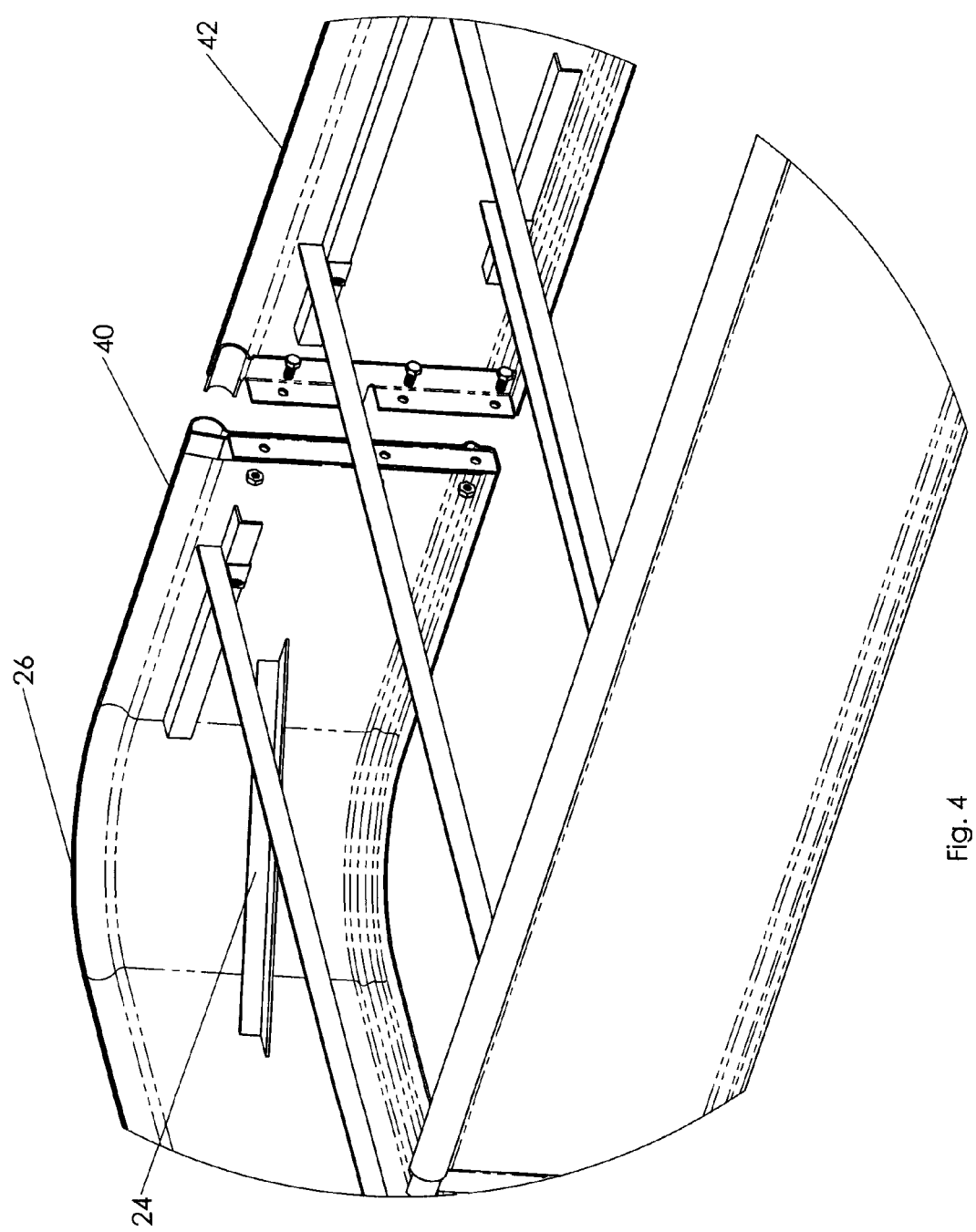
FIG. 4 is an example view of a connecting device for connecting two wall members in an open position.
Figure 5:
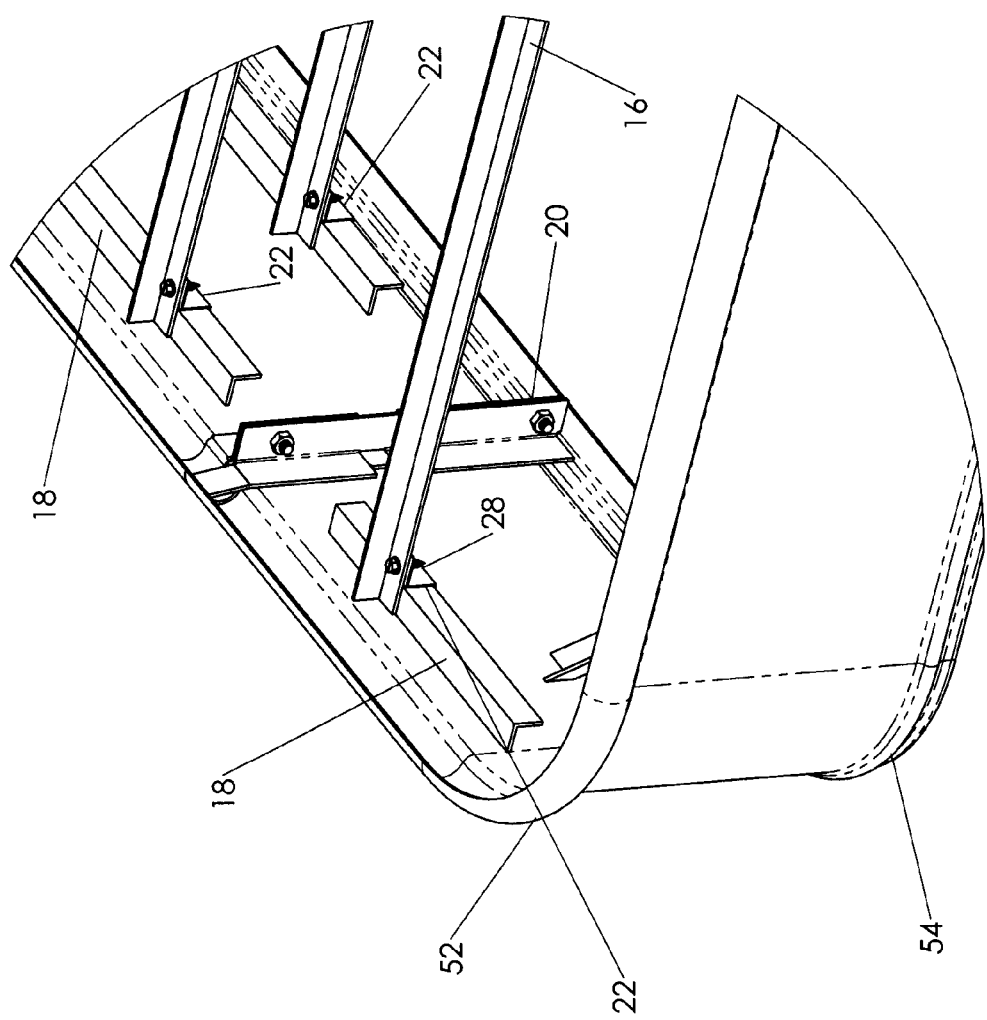
FIG. 5 is an example view of a corner section of the pouring form.
Figure 6:
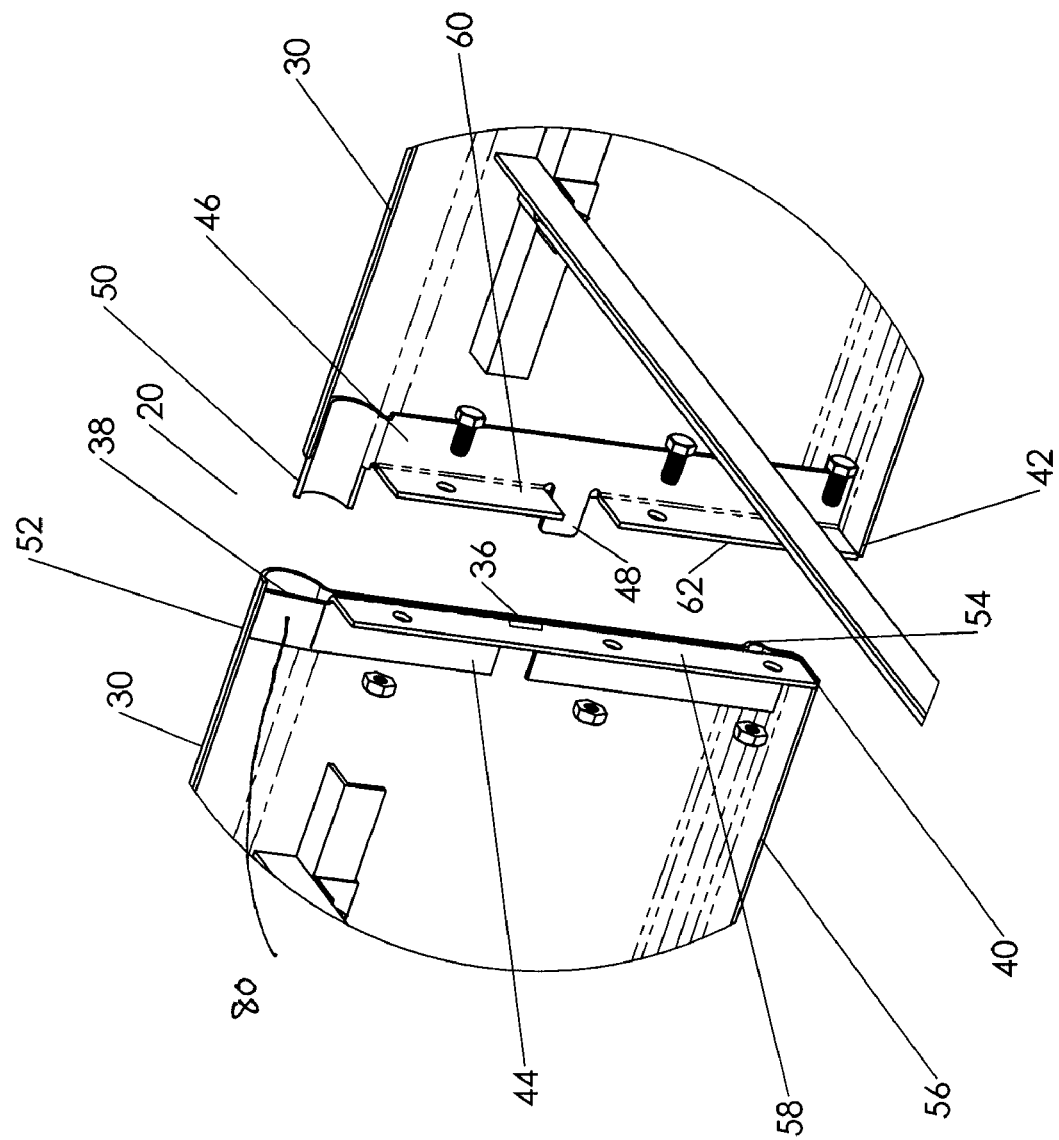
FIG. 6 is an example detailed view of a connecting device for two wall members in the open position.
Figure 7:
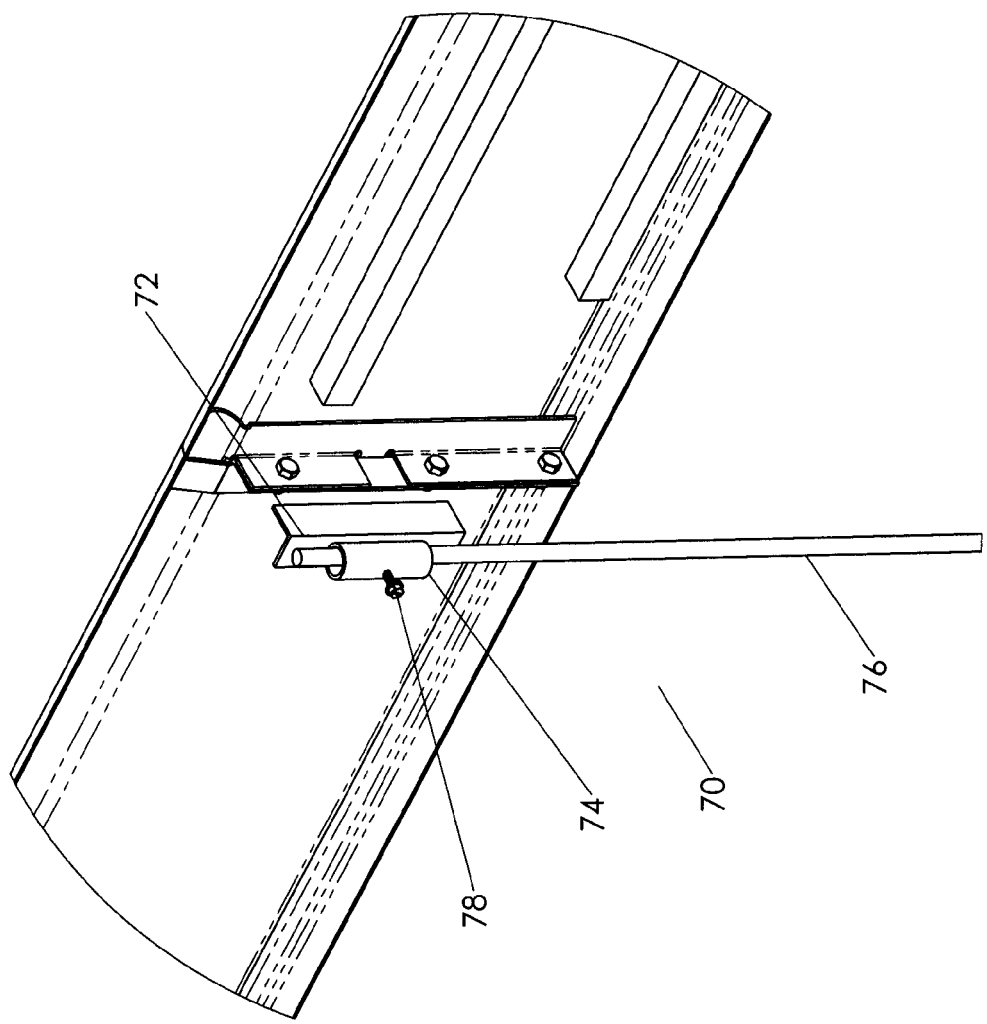
FIG. 7 is an example isometric view of a leveling device for the pouring form.
Figure 11:
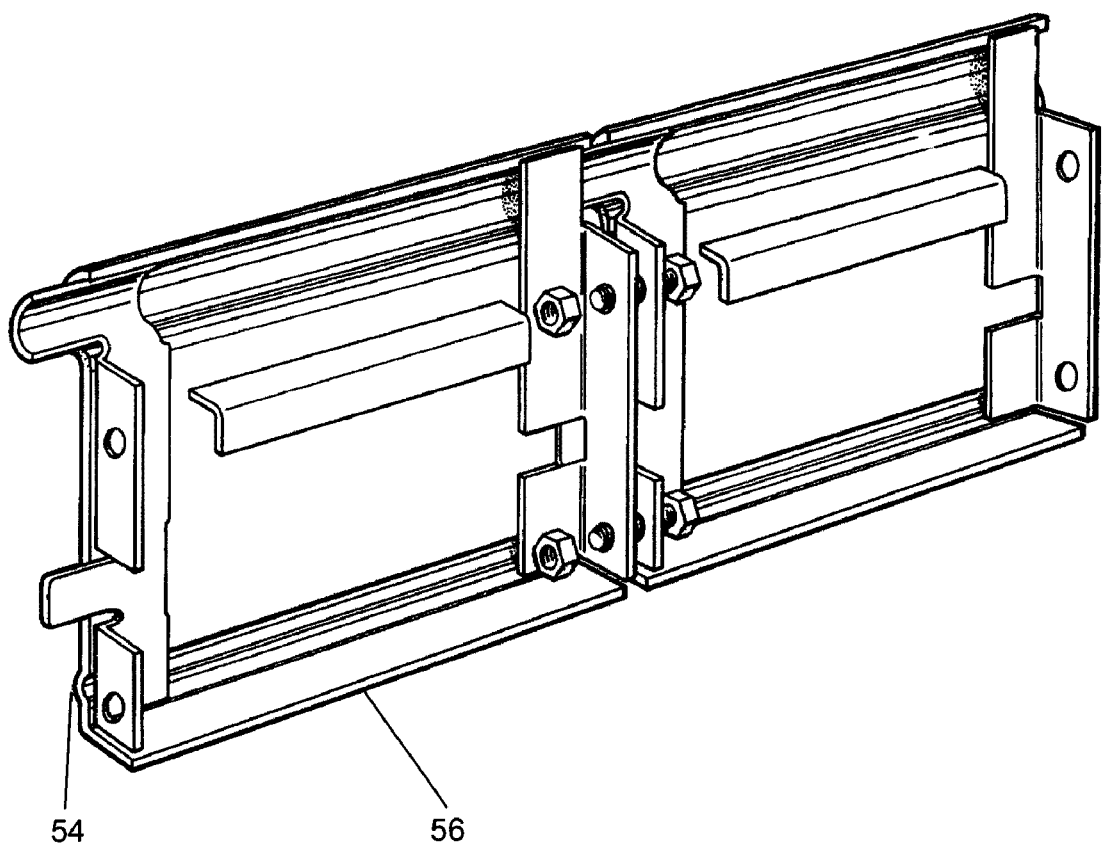
FIG. 11 is an example view of a side wall connecting device.

The example embodiment of FIG. 1 shows a pump island with both curved and straight wall members forming the pouring form 10. Turning to FIG. 2, some exemplary embodiments will have a plurality of wall members 30 with both straight side wall members 34 and curved end wall members 32. The wall members form a shape such that when connected together in adjacent formation, the wall members 30 define an enclosure for receiving and retaining fluid poured concrete therein. In an example embodiment shown in FIG. 2, the pouring form is composed of four wall members 30 consisting of two end wall members 32 and two straight side wall members 34. The ends of each adjacent wall member are connected to each other with a connecting device 20 to be discussed later. In an example embodiment the wall members have an inwardly facing curled curved top flange 52 at the top edge of the wall member 30 so that as concrete flows into the pouring form 10 it will be maintained underneath the top curled flange 52 within the pouring form 10. The semi-circular shaped curled flange 52 in some embodiments extends upwardly away from the substantially planar wall member 30. The curvature of the flange 52 may extend beyond the outer surface of the wall member 30 so that a concrete island edge can be provided during use which has a sufficient thickness to resist breakage. Wall members 30 may have a second inwardly curved bottom curve 54 (or bead) and a flattened lip 56 as is best seen in FIGS. 1 and 6. Of course in other embodiments, other combinations of wall curved edges could be used and there may not be a lip on the bottom of the wall members 30. The example embodiment shown in FIGS. 2 through 10, for ease of explanation, show a configuration of the pouring form that is relatively rectangular in shape. However, in other embodiments the pouring form could be any other conceivable or possible shape including also barbell, bowtie, oval, rectangular, square, round, curved or waved shapes, for example.

In some embodiments the wall members 30 and other parts of the pouring form 10 are manufactured from coiled galvannealed steel by a roll forming process to produce uniform sections that precisely fit together. Roll forming is a rapid method of forming long lengths of structural shapes by a continuous bending operation through a series of rolls. The precision of the resultant wall members 30 and integral connecting means results in adjacent wall members uniformly fitting together to avoid the extensive use of alternative connecting devices 20. In some embodiments the wall member 30 heights are about nine (9) inches or thirteen (13) inches.

Galvannealed steel in some example embodiments may be steel that has passed through a galvannealing process. In a galvannealed process steel sheet metal iron atoms may be combined with zinc atoms in the steel surface layers. In some embodiments the iron and zinc atoms may be combined at high temperatures. A sheet of steel may be dipped into a bath of zinc at about 450 degrees Celsius. In other example embodiments, after being dipped in zinc the steel may then be passed through a series of furnaces to raise the temperature to as much as 700 degrees Celsius. During heating, iron atoms from the molten steel sheet may drift into the zinc coating to form a zinc-iron alloy.

In one example embodiment every component of the pouring form 10 may be made out of galvannealed steel. Such components may include the pouring form walls 30, leveling devices 70, cross members 16, support bars 18, connection devices 20 and any other components that make up a completed pouring form 10. In some embodiments every component of the pouring form 10 will be manufactured out of galvannealed steel with each component having its dimensions to within a five-thousandth of an inch of precision. In an embodiment the described form manufactured out of galvannealed steel may be painted without the application of a pretreatment which may be washing or priming, although in other embodiments a pretreatment may be performed to enhance the performance after painting. In an example embodiment the paint coating on a galvannealed steel form may be applied by dipping the galvannealed steel into a tank of paint.

As shown in FIG. 21, in some example embodiments the pouring form 10 with plurality wall members 30 has a connecting device at each end of each pouring form wall member 30. The connection device 20 is operative to securely connect adjacent wall members together without the need of specialized tools or other external equipment in other example embodiments a variety of fastening devices could be used to connect the pouring form walls 30 together. In some embodiments some wall members may be connected with a connecting device 20 and other pouring form wall members may be connected by welding, bolts, screws, or any other suitable fastener.

The connecting device 20 in the example embodiment is manufactured out of galvannealed steel. The connecting device 20 is attached to the end of each wall member 30 in the example embodiment by welding. In other embodiments, the connecting device 20 could be attached to the member 30 by any suitable fastener. As is shown in FIG. 6, each wall member 30 has two ends 40, 42 for connecting to the adjacent wall member 30. The connecting device 20 is composed of a section 44 with slots and a section 46 with tabs. The section 44 with slots is configured with a straight slot 36 and a tab 80 over a curved slot 38. The section 46 with tabs is configured with a flat tab 48 and a curved tab 50 that is curved to fit inside the top curved slot 38 of the adjacent wall member 30. In FIG. 6 the connecting device is shown configured with just one flat tab 48, however in other embodiments the connecting device could be configured with more than one flat tab and the bottom of the connecting device could be configured with a curved flange curved tab. In some embodiments, the section 44 with slots may be configured with a flange 58 extending into the interior of the form. The connection device section 46 with tabs is configured with a flange 60 between the flat tab 48 and the curved tab 50 and a flange 62 below the flat tab 58 and the bottom of the wall member 30. In some embodiments holes are drilled through the connecting device flanges, 58, 60, 62 so that the adjacent flanges and adjacent wall members 30 may be bolted together to form a connection to prevent the loss of liquid or concrete. FIGS. 2-6 show a connection device that uses three bolts to bolt adjacent wall sections together, however, other embodiments are capable of using a different number of bolts or any suitable fastener for connecting the connection device 20 section 44 with slots and the adjacent connection device section 46 with tabs.

The connection device 20 shown in FIGS. 2-6 may be used in some embodiments to prevent the loss of liquid concrete. This connection device may prevent the loss of concrete by having the surfaces of the top curved tab 50 and the straight tab 48 overlap adjacent wall member 30 surfaces and by having flange 58 overlap the surface area of flanges 60 and 62. This described connection device places overlapping material the entire width of the wall member 30, to prevent liquid concrete from escaping the pouring form.

As is shown in FIGS. 7-10 in some embodiments, the pouring form includes a plurality of galvannealed steel leveling devices 70 attached to the pouring form to allow quick leveling of the form at the job site. In some embodiments the leveling devices 70 may include a support device such as an angle bar 72 of galvannealed steel that may be welded vertically to the interior surface of a wall member 30. In other embodiments the support devices may be comprised of material other than galvannealed steel, may have shapes other than angled steel bar, and any suitable fastener may be used to attach the leveling device to the interior wall surface. In some embodiments the leveling device may include a holder 74 of galvannealed steel that may be welded parallel on the outside surface of the angle bar 72 and is operative to receive a level rod 76 there through. At the job site the level rod 76 may be inserted inside the holder 74 and the wall member(s) may be adjusted to the proper height to level the pouring form 10. When the form is level, a screw 78 may be tightened to maintain the pouring form at the proper level.

The form may be manufactured by a roll forming process. The roll forming machine used to manufacture forms may include eight roll forming stations. As a section of steel passes through a station, the rollers in the station are capable of bending the steel a little more than the prior station. In some embodiments the same roll forming machine can be set up to produce galvannealed steel wall members and can also be set up to produce galvanized steel members that will later be hot dipped. In some embodiments software running in a computer may be programmed to allow a computer to set up the roll stations for galvannealed or hot dipped steel fabrication. Such software may be adapted to adjust the location and or size of features in the metal to account for changes in thickness caused by the hot dipped process.

Some embodiments may use a two stage power spray washer. The pouring form components may be carried through the system by a continuous overhead conveyor. In some embodiments the overhead conveyor is a Jervis B. Webb Power and Free Conveyor System with ten (10) to twenty (20) foot load bars each with a 600 pound capacity. In some embodiments the system cycle time (the time pouring forms are washed, painted and cured) may be about 60 minutes. A power spray washer may be used for the pre-painting, cleaning and pretreatment of the pouring form components. An aimed, pressurized aqueous spray may be used to wash the pouring form components. The pouring form components may be carried through a wash and rinse zone by the overhead conveyor. In some embodiments gas fired immersion tubes may be used to heat the wash zone to about 150 degrees Fahrenheit. The wash solution is directed at the pouring form components through a series of about ninety (90) riser mounted spray nozzles. In some embodiments the wash solution in the first stage may be McGean-Rohco Jet Compound 93. The wash solution may be capable of being recirculated by a 380-gpm pump. In some embodiments skimming weirs, filter screens, and an inline filter system may be used to remove oil and sediment from the wash solution. The pouring components may spend about 40 seconds being sprayed in the initial washing stage. In some embodiments the pouring form components next go through a rinse zone that may be the same as the wash zone except that the rinse solution is unheated fresh water. In some embodiments the pouring form components may then pass through a 3000 cfm air blow-off to remove excess water.

After cleaning, the pouring form components are ready for painting, so they may be carried by the indexing conveyor drive to transport the pouring form components to a paint dip tank where in some embodiments the components are totally immersed in the paint. In some embodiments the tank of paint may be about 4'×13'6"×8' deep with a 3000 gallon capacity. A paint tank of that size allows for about a 6 feet high×12 feet long×3 feet wide pouring form component to be painted by completely being dipped in the paint tank. In some embodiments the tank may contain a red priming paint and in some embodiments it may contain Sherwin Williams Kem Aqua 70P Water Reducible Metal Primer. The paint tank may be capable of being operated with a skimming weir and continuous recirculation at thirty (30) GPM via immersion piping and air-operated diaphragm pump. In some embodiments the tank dwell time may be about five (5) seconds and nominal drip time when the pouring form components are removed from the paint tank over the tank may be about sixty (60) seconds. Conveyor indexing and sequencing then allows for sixteen (16) minutes of flash time before the pouring form components enter the cure oven. The curing oven may be of a recirculating design. In some embodiments the oven may be a forced air convection curing oven. In some embodiments the pouring form components may then be carried through the oven chamber by the overhead conveyor at a designed conveyor rate of about ten (10) feet per minute. The oven dwell for all the parts may be about sixteen (16) minutes of curing time within the heated "working" chamber of the oven. To provide uniform temperature distribution, the heated air may be directed at the parts from overhead plenum ducts. A backward inclined, high temperature blower provides recirculated air. In some embodiments the heat for the oven may be supplied by a MAXON direct fired gas system with 1.5 million BTU/HR input. Oven controls may maintain about a constant 180 degrees Fahrenheit temperature throughout the oven. The pouring form components may then be carried to an unload area by the overhead conveyor. In some embodiments all surfaces may be covered with paint that is about one (1) mil thick. In some embodiments twelve (12) minutes of cool down time may be allowed before the parts are unloaded from the system.

Figure 12:
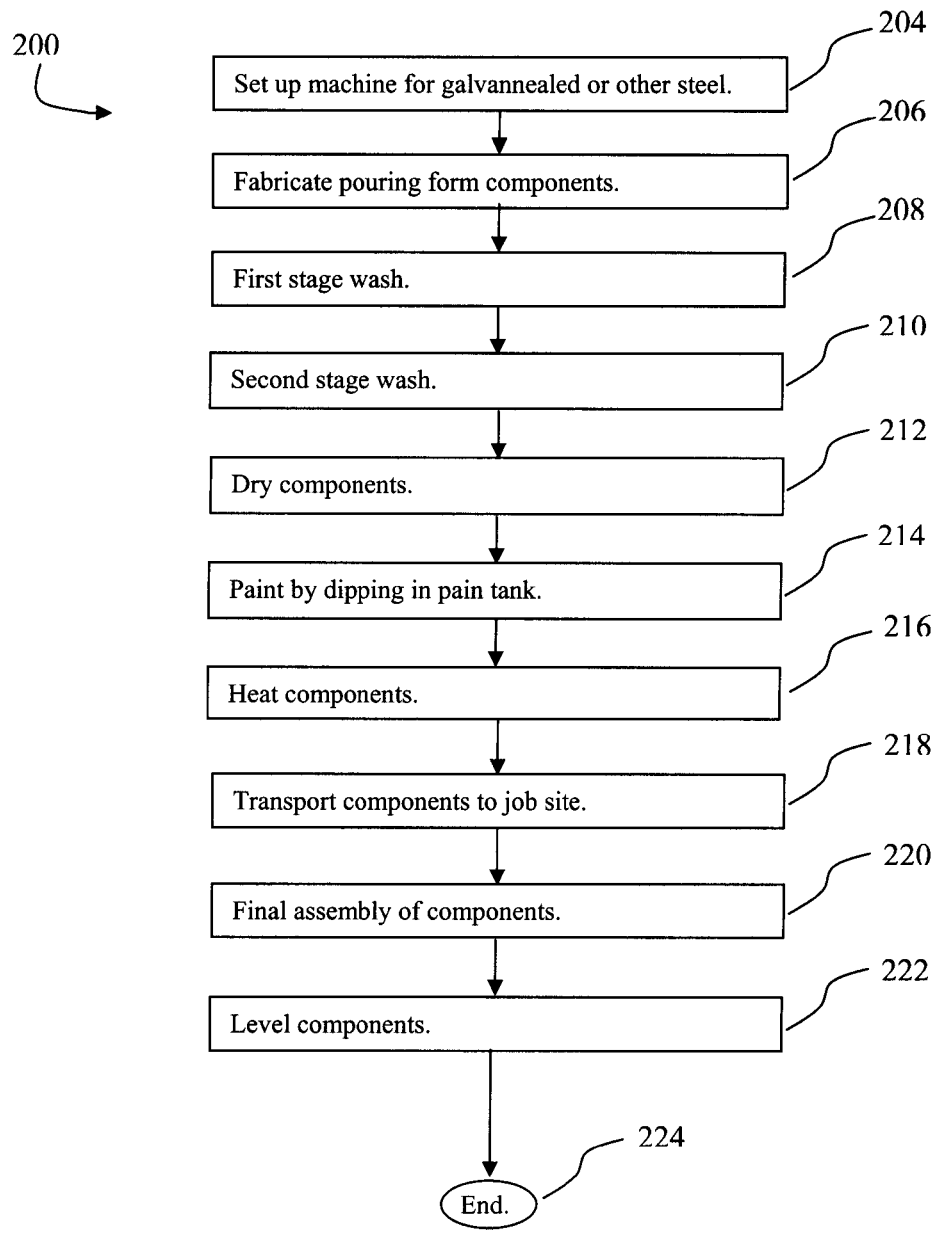
FIG. 12 is a diagram of a sample method for producing and using pouring forms.

FIG. 12 shows an example method of manufacturing pouring forms. The method may include a step 204 where the machinery is set up depending on what type of material the pouring forms are going to be made out of. In other embodiments the same machinery that is used to process the rolled galvannealed steel pouring form wall members 30 can also be suitably adjusted to processes carbon steel into pouring form wall members 30. Because carbon steel is often later hot dipped, the pouring form components may need to have openings and alignments slightly adjusted to account for the thickness that the hot dipped galvanizing material will be adding to the component when it cools. In some embodiments the machinery used to produce galvannealed steel may be adjusted when switching between the manufacture of carbon steel or galvanized steel wall members to account for hole and cut locations having different dimensions and locations. As discussed previously, software adapted to control the wall forming machine may be operable to make these adjustments. For example, the flat tab 48 and curved tab on the connecting members will be slightly thicker after hot dipping so the straight slot 36 and curved slot 38 may be made larger in the hot dipped component than in the galvannealed component.

After the machinery has been set up, the method may include a step 206 where the pouring form components are manufactured. In some embodiments the process of manufacturing a wall member may involve rolling galvannealed steel through eight stations. At each station the wall member steel is bent a little bit more than the previous station. After the steel exits the last station it is cut into individual wall member sections. As shown in FIG. 2, in some embodiments after a wall member section is completed, components such as corner braces 24, support bars 18, cross members 16, connection devices 20 and leveling devices 70 may be attached to the wall member. At step 208 the manufactured wall members and other components are prepared for painting in a first stage wash. In some embodiments a McGean-Rohco Jet Compound 93 wash solution is directed at the pouring form components through a series of about ninety (90) riser mounted spray nozzles. In some embodiments the pouring form components are transported from the first wash stage 208 through the heating stage at step 216 by an overhead conveyor system. After the first stage wash, the pouring form components enter a second stage wash where they are again washed by a fresh water spray at step 210. A drying step at step 212 insures that the forms are nearly dry before entering the painting step at step 214. In some embodiments, the form components are painted by completely dipping them into a tank of paint. In some embodiments the paint tank dwell time for the components to be completely submerged in a tank of paint may be about five (5) seconds and nominal drip time when the pouring form components are removed from the paint tank and held over the tank may be about sixty (60) seconds. After dipping in a tank of paint, the pouring form components enter the cure oven where they are heated in step 216. In some embodiments the heat step heats the pouring form components with a constant 180 degrees Fahrenheit temperature cure oven for about sixteen (16) minutes. The pouring form components are then carried to the unload area by the overhead conveyor. Next, at step 218, the components are transported to the job site. At the job site, the final assembly of all the components takes place at step 220. Here the wall members are connected together using the connection members. In some embodiments after all the components are assembled, the pouring form is leveled in step 222 using the pouring form's leveling devices 70 and at step 224 the form is ready to receive concrete.

Thus, the pouring form apparatus and method of the exemplary embodiments achieves at least some of the above stated objectives, reduces corrosion, eliminates difficulties encountered in the use of prior devices and systems, and attains the useful results described herein.

In the foregoing description certain terms have been described as exemplary embodiments for purposes of brevity, clarity and understanding. However, no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained;

the new and useful structures, devices, elements, arrangements, parts, combinations, systems, equipment, operations, methods, processes and relationships are set forth in the appended claims.

The invention claimed is:

1. A form for gas station islands for receiving a filler material, comprising:
   a substantially continuous wall having an outer surface and an inner surface, the inner surface forming an enclosed chamber for receiving a filler material, wherein the wall includes a plurality of wall members manufactured out of galvannealed steel, wherein each wall member includes an upper edge including an inwardly facing curled flange; and
   a plurality of leveling devices made out of galvannealed steel attached to the plurality of wall members, wherein each leveling device includes: a support device made out of galvannealed steel attached to an internal side of a wall member; a hollow holder made out of galvannealed steel attached to the support device so as to support the holder away from the wall member; a rod made out of galvannealed steel extending through the holder; and a screw extending through a wall of the holder and securing the rod in the holder.

2. The form of claim 1, wherein adjacent wall members are connected at their ends with a connection device made out of galvannealed steel, wherein the connection device is comprised of two separate sides, including a first side and a second side, wherein the first side is attached to a first wall member and the second side is attached to a second wall member;
   wherein the first side of the connection device includes at least one flat tab and a curved tab, wherein the curved tab is curved radially inward with a curvature corresponding to the curled flange of the second wall member;
   wherein the second side of the connection device includes at least one straight slot and a top tab which extends across the curled flange of the second wall member;
   wherein adjacent first and second wall members are connected with the at least one flat tab extending through the at least one straight slot and the curved tab extending between the top tab and the curled flange of the second side.

3. The form of claim 2, wherein the first and second sides of the connection device are fastened together with at least one bolt.

4. The form of claim 3, wherein a first support bar made out of galvannealed steel is attached to the inner surface of a first side of the wall, and wherein a second support bar made out of galvannealed steel is attached to the inner surface of a second side of the wall; and
   a cross member made out of galvannealed steel is disposed between the support bars, the cross member removably engaging the support bars.

5. The form of claim 4, wherein the wall members include a coating of paint, wherein the coating of paint covers the entire wall member surface with about 1 mil of paint.

6. A form for gas station islands for receiving a filler material, comprising:
   a substantially continuous wall having an outer surface and an inner surface, the inner surface forming an enclosed chamber for receiving a filler material, wherein the wall includes a plurality of wall members manufactured out of galvannealed steel, wherein each wall member includes an upper edge including an inwardly facing curled flange;
   wherein adjacent wall members are connected at their ends with a connection device made out of galvannealed steel, wherein the connection device is comprised of two separate sides, including a first side and a second side, wherein the first side is attached to a first wall member and the second side is attached to a second wall member;
   wherein the first side of the connection device includes at least one flat tab and a curved tab, wherein the curved tab is curved radially inward with a curvature corresponding to the curled flange of the second wall member;
   wherein the second side of the connection device includes at least one straight slot and a top tab which extends across the curled flange of the second wall member;
   wherein adjacent first and second wall members are connected with the at least one flat tab extending through the at least one straight slot and the curved tab extending between the top tab and the curled flange of the second wall member;
   wherein the wall members include a coating of paint, wherein the coating of paint covers the entire wall member surface with about 1 mil of paint;
   a first support bar made out of galvannealed steel is attached to the inner surface of a first side of the wall, and wherein a second support bar made out of galvannealed steel is attached to the inner surface of a second side of the wall;
   a cross member made out of galvannealed steel is disposed between the support bars, the cross member removably engaging the support bars;
   a plurality of leveling devices made out of galvannealed steel attached to the plurality of wall members;
      wherein each leveling device includes: a support device made out of galvannealed steel attached to an internal side of a wall member; a hollow holder made out of galvannealed steel attached to the support device so as to support the holder away from the wall member; a rod made out of galvannealed steel extending through the holder; and a screw extending through a wall of the holder and securing the rod in the holder.

* * * * *